US005472600A

United States Patent [19]
Ellefson et al.

[11] Patent Number: 5,472,600
[45] Date of Patent: Dec. 5, 1995

[54] GRADIENT DENSITY FILTER

[75] Inventors: Peter J. Ellefson, Apple Valley; David A. Wells, Maplewood, both of Minn.

[73] Assignee: Minnesota Mining and Manufacturing Company, St. Paul, Minn.

[21] Appl. No.: 382,281

[22] Filed: Feb. 1, 1995

[51] Int. Cl.$^6$ .................................................. B01D 25/00
[52] U.S. Cl. ............................................ 210/317; 210/488
[58] Field of Search ............................. 210/317, 488, 210/505, 507

[56] References Cited

U.S. PATENT DOCUMENTS

| | | | |
|---|---|---|---|
| 956,832 | 3/1910 | Seitz. | |
| 3,353,682 | 11/1967 | Pall et al. | 210/505 |
| 3,847,821 | 11/1974 | Krueger | 210/488 |
| 4,701,267 | 10/1987 | Watanabe et al. | 210/806 |
| 4,925,572 | 5/1990 | Pall | 210/767 |
| 5,279,742 | 1/1994 | Markell et al. | 210/638 |
| 5,338,448 | 8/1994 | Gjerde | 210/198.2 |

OTHER PUBLICATIONS

V. A. Wente, "Superfine Thermoplastic Fibers," *Industrial and Engineering Chemistry*, vol. 48, No. 8, 1342–46 (Aug. 1956).
V. A. Wente et al., "Manufacture of Superfine Organic Fibers," Naval Research Laboratory Report 4364 (May 25, 1954).
C. Y. Chen, "Filtration of Aerosols by Fibrous Media," *Chemical Reviews*, 55, 595–623 (1955).

*Primary Examiner*—Frank Spear
*Attorney, Agent, or Firm*—Gary L. Griswold; Walter N. Kirn; David G. Burleson

[57] ABSTRACT

A gradient density filter made from sheets of blown polypropylene microfibers where the microfibers of at least one of the sheets have an effective fiber diameter less than that of the other sheets is described. This filter is especially useful in solid phase extraction processes, particularly those where biological fluids are being analyzed.

16 Claims, 2 Drawing Sheets

GRADIENT DENSITY FILTER

BACKGROUND OF THE INVENTION

1. Field of the Invention

This invention relates to a filter comprising nonwoven, blown polypropylene microfiber sheets which is especially useful in solid phase extraction processes. The effective pore size of the filter decreases with increasing depth.

2. Background Information

Depth filters have been available for a number of decades. U.S. Pat. No. 956,832 describes a filtering unit consisting of "intimately connected strata, each stratum being homogeneous in respect to its porosity and the different strata having pores of different degrees of fineness, the several strata being arranged transversely to the direction of the flow of liquid therethrough." The materials described as being useful are naturally occurring materials such as cellulose, asbestos fibers, and cotton fibers because synthetic fibers were unknown at the time.

More recent descriptions of depth filters have broadened the scope of fibers used in their preparation. Depth filters for blood filtration are described in U.S. Pat. No. 4,701,267, where multiple layers of nonwoven mats of increasing bulk density are used as filters. These mats can be made from synthetic fibers, semi-synthetic fibers, regenerated fibers, inorganic fibers and natural fibers, with polyester being exemplified. The nonwoven mats comprise fibers of an average diameter of from 0.3 to less than 3 µm.

U.S. Pat. No. 3,353,682 describes a multilayer depth filter for biological filtrations, where the filter is made in a wet-laid fashion from short fibers. A typical construction includes a fine filter having pores in the range of 10 to 25 µm and a course filter having pores in the range of 70 to 150 µm. These filters are said to be capable of absolutely removing from fluids particles "as small as 25 microns in size, and even particles of 10 microns down to 0.03 microns and smaller." Above the fine filtering portion of the filter is a layer that protects the fine filter from being clogged by particles up to 150 µm in size. Thus, the overall construction acts as a type of depth filter. In addition to natural fibers, synthetic fibers including polypropylene are said to be useful. Binders for the fibers are discussed in detail.

U.S. Pat. No. 4,925,572 describes a leukocyte filter for blood which uses gradient density filters made from nonwoven materials. One embodiment describes a series of 15, 10, and 7 µm polybutyleneterephthalate (PBET) filters below a "gel filter" made from 30 to 50 µm PBET. Modification of the fiber surface, by grafting, priming, or other "preconditioning means" is required to decrease the critical wetting surface tension of the filter mats.

U.S. Pat. No. 5,338,448 describes solid phase chromatographic column which employs a "guard disk" as a protective pad above the absorptive material of the column, retaining both particles and dissolved contaminants. The guard disk comprises sorptive chromatographic material incorporated into a woven or nonwoven fabric or membrane, or may comprise a fabric or membrane matrix having stationary phase functional groups covalently bonded to the fabric or membrane structure itself. The guard disk must contain sorptive material. The protective disk may comprise a plurality of fabric or membrane layers, and pore sizes for the protective disks are in the range of 0.1 to 5 µm.

SUMMARY OF THE INVENTION

Briefly, the present invention provides a filter comprising a plurality of sheets of blown polypropylene microfibers, at least one of those sheets having an effective pore diameter smaller than the effective pore diameter of at least one sheet upstream therefrom, all of the polypropylene fibers having a critical wetting surface tension less than about 50 dynes/cm, the aggregate average effective diameter of the microfibers being at least 3 µm. By "critical wetting surface tension" (CWST) is meant the mean value of the surface tension of a liquid that is absorbed into a porous medium and the slightly higher surface tension of a liquid that is not so absorbed. The CWST can be determined by applying to the surface of a porous medium a series of liquids having surface tensions that vary by a set amount (e.g., 2 to 4 dynes/cm) and observing the absorption or non-absorption of each liquid.

The polypropylene microfibers used in the sheets of the filters of the present invention preferably are "virgin". In other words, they are essentially free of binders, finishing agents, and other adjuvants which often are added to or coated on polypropylene fibers during or after the formation of a microfibrous web. Such fibers will, however, contain those materials that are added during the polypropylene formation process (e.g., antioxidant). "Virgin" polypropylene microfibers contain no additives other than those inherent in the synthesis of the polypropylene.

The filter of the present invention is especially useful where the fluid to be filtered is a biological fluid, such as blood, plasma, serum, urine, or some other such fluid. Such biological fluids often contain small amounts of insoluble materials that can interfere with analyses to be performed on those fluids. Removal of such insoluble materials is a continuing concern to those who perform medical and chemical analyses, because such fluids must be "clean" (i.e., free of insoluble materials) to be analyzed accurately.

One analysis where the filter of the present invention is especially useful is solid phase extraction. By "solid phase extraction" is meant the removal or isolation of one or more soluble analytes from a fluid by means of sorption to immobilized solid particles. Such solid phase extractions normally are performed using packed beds of particles that are capable of sorbing the analyte(s). More recently, however, solid phase extractions have been performed using disks in which the particles are entrapped in porous fibrous polymeric or glass fiber webs. However, when a fluid that contains insoluble material (e.g., a biological fluid) is passed through such disks, the insoluble material often becomes entrapped in the pores of the web, thereby reducing the ability of the disk to allow fluid to pass therethrough (i.e., increasing the pressure drop).

Advantageously, the filter of the present invention has a very small dead volume (e.g., about 40 µL). Therefore, the filter of the present invention has little negative effect on the required elution volume.

DETAILED DESCRIPTION OF PREFERRED EMBODIMENTS

Figure 1:
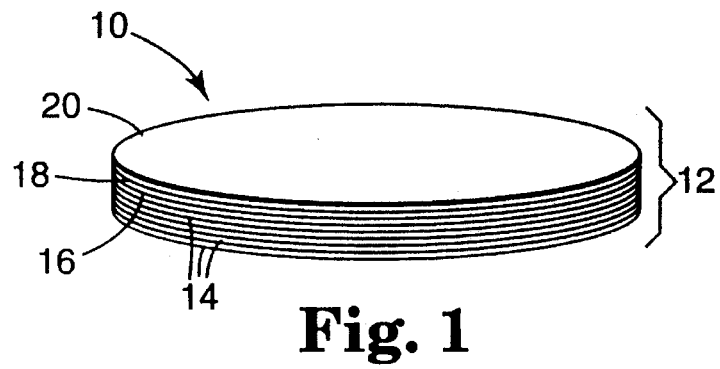
FIG. 1 is a greatly enlarged perspective view showing one embodiment of a gradient density polypropylene filter of the present invention.
Figure 2:
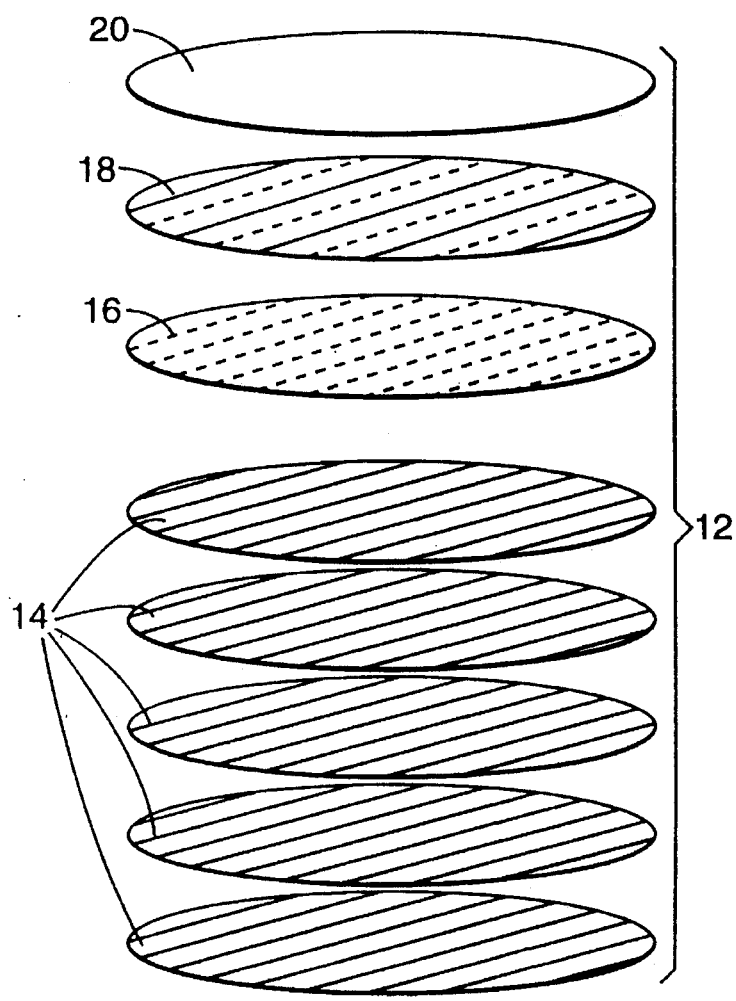
FIG. 2 is a greatly enlarged exploded view of the multilayer polypropylene gradient density filter from FIG. 1.

Referring to FIGS. 1 and 2, filter 10 comprises a plurality of sheets of blown polypropylene microfibers 12. To maximize efficiency, at least one of downstream sheets 14 or 16 must have an effective pore diameter that is smaller than the effective pore diameter of at least one sheet upstream therefrom, 16 or 18 respectively. This gradient density characteristic provides improved performance over filters having a uniform pore diameter.

Preferably, filter 10 comprises at least three sheets (14, 16, and 18), each of which has an effective pore diameter different from those of the other two sheets. The effective pore diameter of a given sheet is a function of, inter alia, the effective diameter of the fibers that make up that sheet. Sheets 14, 16, and 18 are preferably arranged (from upstream to downstream) in order of decreasing effective pore diameters, in other words, decreasing fiber diameter. If desired, a multiplicity of any of sheets 14, 16, or 18 can be used. Sheets of various fiber diameters 12 are then laminated to form an essentially unitary construction, i.e., filter 10. Lamination can be accomplished by any of a number of well known means in the art including nip rolling, hand pressing, etc.

Cover layer 20 can be added to plurality of sheets 12 of filter 10. Cover layer 20 is preferably more rigid than any of sheets 12. Cover layer 20 helps to maintain the overall integrity of filter 10 (or of a solid phase extraction system in which filter 10 is incorporated) during transportation, handling, and/or use. Preferably, cover layer 20 is made of a polymeric material so that filter 10 (or a solid phase extraction system in which filter 10 is incorporated) maintains a high degree of chemical inertness. Most preferably, cover layer 20 will be made of the same polymer (i.e., polypropylene) as sheets 12. Cover layer 20 can take various forms, including but not limited to, a screen, a scrim, or a membrane. Preferably, the form chosen will allow cover layer 20 to be laminated along with sheets 12. A preferred cover layer 20 is a spunbonded polypropylene membrane, such as a Typar™ membrane (Reemay Inc.; Old Hickory, Tenn.), which is known by the trade name Tekton™ outside of the Western hemisphere. Typar™ 3801 sheets have been found to be especially useful because of their high rigidity. Additionally, where a membrane is used as cover layer 20, it can provide additional filtering capability (i.e., for a relatively coarse material in the liquid to be filtered). In FIGS. 1 and 2, an embodiment of the filter of the present invention that includes one sheet 18 of polypropylene microfibers with, for example, effective diameter of about 15 μm, one sheet 16 of polypropylene microfibers with, for example, an effective fiber diameter of about 7 μm, and five sheets 14 of polypropylene microfibers with, for example, an effective diameter of about 3 μm, is shown. Of course, other arrangements of sheets 12 are possible and within the scope of the present invention. For example, for some applications, sheet 16 (where the effective diameter of the polypropylene microfibers is about 7 μm) can be removed without deleteriously effecting the performance of filter 10. Additionally, an arrangement of, for example, sheets with effective diameters of 13, 8, and 4 μm (or some other such combination) can be effective.

Blown microfiber sheets 12 can be prepared according to processes well known in the art. See, e.g., V. A. Wente, "Superfine Thermoplastic Fibers," *Industrial and Engineering Chemistry*, vol. 48, no. 8, 1342–46 (August 1956) and V. A. Wente et al., "Manufacture of Superfine Organic Fibers," Navy Research Laboratory Report 4364 (May 25, 1954).

Polypropylene resin useful in making microfibers for sheets 12 is available from a variety of sources, including Exxon Chemical Co. (Houston, Tex.), as Grade PP3505G. During processing of the resin to make microfibrous sheets 12, the addition of binders, finishing agents, or other adjuvants commonly used during the fiber formation process preferably is scrupulously avoided. As those skilled in the art will recognize, any contaminant that might potentially leach from filter 10 during use can interfere with analysis being performed on the filtered liquid (i.e., eluent). Accordingly, the addition of any such leachable material is preferably avoided.

The microfibers of sheets 12 have a CWST less than about 50, preferably less than about 45, and more preferably less than about 40. Most preferably, the microfibers of sheets 12 have a CWST equal to, or very nearly equal to, that of untreated polypropylene (i.e., about 25 dynes/cm). Webs (i.e., sheets) prepared from such microfibers are effective in removing insoluble materials from fluids that might contain analytes on the basis of their size, dimension, and/or affinity. Most analytes do not have an affinity for untreated polypropylene and thus pass through the pores between the microfibers.

To make filter 10, sheets 12 having the effective fiber diameters necessary to provide filter 10 with the desired gradiation, optionally along with cover layer 20 in the form of a membrane, screen, scrim, etc., are layered in a stacked construction and drawn over a series of drums at a rate of from about 8 to about 80 m/min. This laminated stacked construction is then slit into strips from which filter 10 of a desired size and shape is cut by means of, for example, a die.

The aggregate average effective diameter of the microfibers of sheets 12 is at least about 3 μm, preferably at least about 3.25 μm, more preferably at least about 3.5 μm, and most preferably at least about 4 μm. (To calculate aggregate average effective fiber diameter, one sums the effective fiber diameter of each of the individual sheets then divides by the total number of sheets.) Despite the fact that the aggregate average effective fiber diameter of sheets 12 is greater than at least about 3 μm, it has been found not to compromise the ability of filter 10 to remove insoluble materials from fluids, particularly biological fluids.

An advantage of the filter of the present invention is that its thickness is less than that of most commonly used gradient density filters. For example, a representative example of the filter of the present invention is about 2.5 mm thick (with at least 90% of the volume thereof being air). This small thickness helps to decrease the amount of inherent dead volume in the filter. Thus, when a filter of the present invention is used in combination with an extraction medium, the filter of the present invention has little negative effect on the required elution volume.

The filter of the present invention is especially useful where the fluid to be filtered is a biological fluid. These fluids often contain small amounts of insoluble materials that can interfere with analyses to be performed on those fluids. The filter of the present invention has been found to be about as effective as glass fiber gradient density filters in removing such insoluble materials. Additionally, the filter of the present invention has a very small dead volume, which helps to increase the accuracy of quantitative analyses performed on fluids filtered therethrough.

Figure 3:
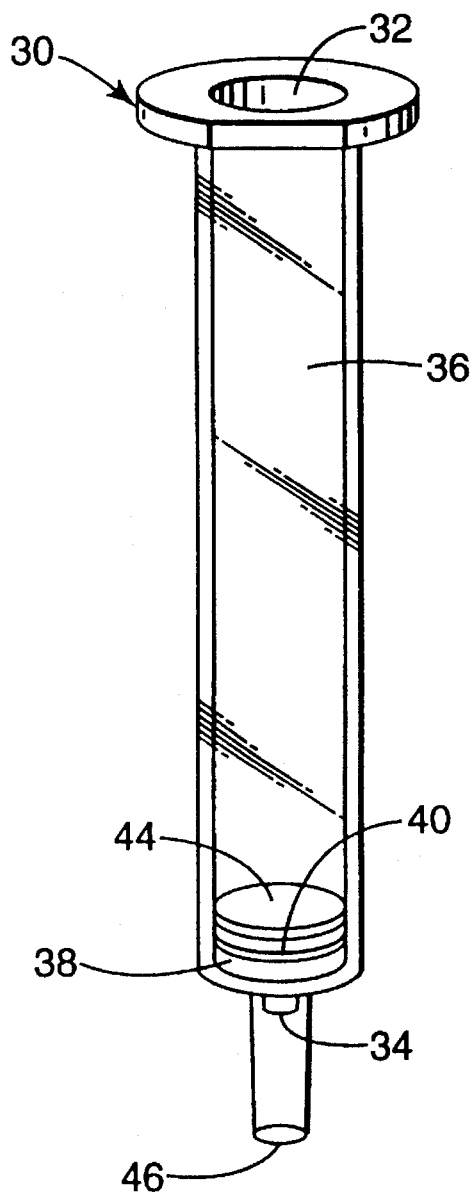
FIG. 3 is a greatly enlarged perspective view of a solid phase extraction disk cartridge in which one embodiment of the multilayer polypropylene gradient density filter of the present invention has been placed above the solid phase extraction disk or the cartridge.
Figure 4:
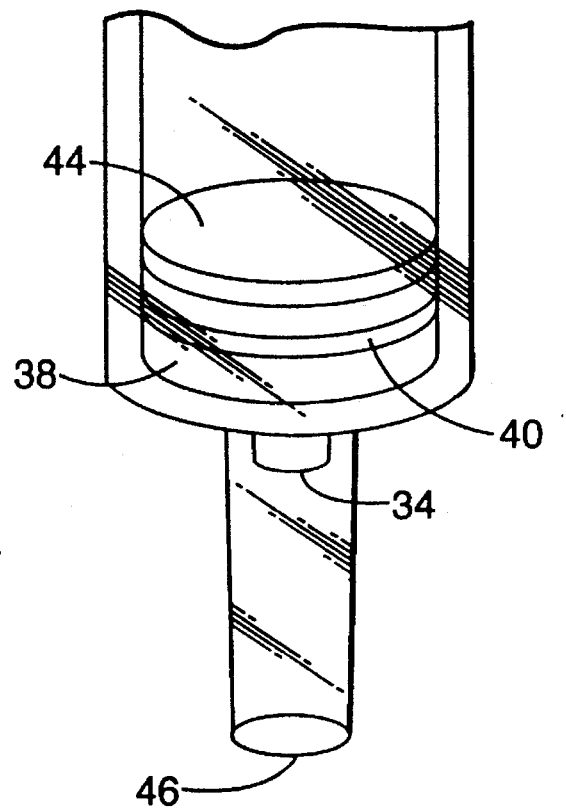
FIG. 4 is a greatly enlarged exploded view of the solid phase extraction disk cartridge of FIG. 3.

Referring now to FIGS. 3 and 4, solid phase extraction disk cartridge 30 includes inlet opening 32 and outlet opening 34, between which is located sample reservoir 36. Cartridge 30 can be made of a variety of materials including polypropylene, polyethylene, glass, nylon, or any commonly used material that is processable into shapes, chemically inert, resistant to common laboratory solvents, and resistant to acidic and basic conditions. Polypropylene is a preferred material. At the bottom of sample reservoir 36 is located base 38. Base 38 supports solid phase extraction disk 40. Optionally, a nonwoven sheet (not shown), made from the same type of material as that used to make cartridge 30, can be placed between base 38 and disk 40 to provide support for disk 40 and to allow for even flow distribution across the surface of disk 40. A preferred type of nonwoven sheet is a Veratec™ 141583 polypropylene sheet (Veratec Co.; Walpole, Mass.). A preferred type of extraction disk 40 is a fibrous polymeric membrane in which is entrapped sorptive particles, such as those described in U.S. Pat. No. 5,279,742, the teaching of which is incorporated herein by reference, although glass fiber membranes in which sorptive particles are entrapped can also be useful. Among particularly useful types of sorptive particles are silica, derivatized silica, bonded silica, activated carbon, derivatized and underivatized poly(styrene divinylbenzene), and alumina.

Optionally, retaining ring 42 can be located directly on extraction disk 40. Retaining ring 42 can be made of any material that is processable into shapes, chemically inert, stable at a variety of pHs, and resistant to common laboratory solvents. A variety of materials, including polypropylene, polyfluoroethylene, polyether ether ketones, and polychlorofluoroethylene, meet these criteria, although polypropylene is preferred for the same reason as set forth previously with respect to a cover layer for the filter of the present invention.

Directly above retaining ring 42 is located gradient density polypropylene microfibrous filter 44. Filter 44 can have any of the constructions described previously. Directly on top of filter 44 can be located a second retaining ring (not shown). This second retaining ring is of the same general construction as retaining ring 42 and can be made from the same or a different material.

Liquid that has passed through membrane 40 exits cartridge 30 through tip 46 that surrounds outlet opening 34. Optionally, a receiving vessel (not shown) can be located beneath cartridge 30 to catch the filtered liquid exiting therefrom.

Those skilled in the art will recognize that the gradient density filter of the present invention can also be useful when used with a column packed with sorptive particles. In other words, the sorptive particles need not be entrapped in extraction disk 40 for the filter of the present invention to screen out insoluble materials that can interfere with the extraction being performed on liquid that is passing by the sorptive particles.

Objects and advantages of this invention are further illustrated by the following examples. The particular materials and amounts thereof, as well as other conditions and details, recited in these examples should not be used to unduly limit this invention.

EXAMPLES

Example 1

Comparative Flow Times and Recoveries of Amitriptyline and Nortriptyline

C-2 Empore™ 7 mm/3 mL solid phase extraction disk cartridges (available on an experimental basis from 3M New Products Dept.; St. Paul, Minn.), were fitted with commercially available filter devices (see Table 1).

To each cartridge was added 1.0 mL human plasma and 0.5 mL of 0.01M $K_2HPO_4$ pH 7.0 buffer ("Buffer A") and mixed with 125 ng amitriptyline and 125 ng nortriptyline (each available from Sigma Chemicals Inc.; St. Louis, Mo.). Each mixture was pulled through the filter and the disk under 38.1 cm Hg vacuum. "Flow time" was measured as the elapsed time from application of vacuum to the time at which the last drop of sample left the cartridge tip.

The filter and disk were washed with a 75:25 (v/v) water-acetonitrile (ACN) solution and air dried under the same vacuum for 5 seconds. The drugs were eluted from the disk with two aliquots of 0.2 mL of a 68:15:17 (v/v/v) mixture of ACN-Buffer A-methanol. Percent recovery of each drug was measured by liquid chromatography, using a Waters Instruments Model 486 HPLC (Waters Corp.; Milford, Mass.) fitted with a 15 cm×4.6 mm inner diameter cyanopropyl column (Supelco Inc.; Bellefonte, Pa.), using a mobile phase of 60:25:15 (v/v/v) ACN-Buffer A-methanol at 2.0 mL/min and a column temperature of 30° C. The presence and amount of each drug were detected by UV absorbance at 215 nm with a detector sensitivity of 0.005 AUFS. Percent recovery was measured relative to an equal amount of each analyte directly injected into the instrument.

Two runs for each filter design were performed. The results are set forth below in Table 1.

TABLE 1

Tricyclic Antidepressant Drugs in Human Plasma

| Filter | Flow Time (min) | Percent Recovery | |
|---|---|---|---|
| | | Amitriptyline | Nortriptyline |
| 1 | 0.87 | 83.4 | 50.8 |
| | 0.88 | 77.8 | 40.9 |
| 2 | 6.42 | 69.8 | 52.0 |
| | 4.65 | 81.6 | 68.6 |
| 3 | plugged | — | — |
| | plugged | — | — |
| 4 | plugged | — | — |
| | plugged | — | — |
| 5 | 4.08 | 94.6 | 81.1 |
| | 4.17 | 92.2 | 82.6 |
| 6 | 0.92 | 90.3 | 78.4 |
| | 0.95 | 98.7 | 76.9 |
| 7 | plugged | — | — |
| | 2.28 | 93.5 | 84.7 |
| 8 | 0.98 | 94.8 | 81.7 |
| | 1.00 | 106.7 | 100.8 |
| 9 | 0.97 | 100.5 | 93.2 |
| | 0.98 | 99.5 | 93.8 |
| 10 | 1.00 | 99.5 | 93.3 |
| | 1.13 | 96.9 | 88.7 |
| 11 | 1.03 | 127.3 | 124.2 |
| | 1.30 | 101.6 | 94.2 |

1) Cellulose Thimble (Whatman, Inc.; Fairfield, NJ)
2) Nylon filter with an effective pore size of 0.45 μm (Chrom Tech, Inc.; Apple Valley, NM)
3) Nylon filter with an effective pore size of 0.2 μm (Chrom Tech)
4) Nylon filters, 0.45 μm effective pore size over 0.2 μm effective pore size (both from Chrom Tech)
5) Qualitative paper (Whatman)
6) Ashless paper (Whatman)
7) Hardened paper (Whatman)
8) One delaminated sheet from a Liquid Disk Filter (LDF) 509A 20 μm diameter spunbonded polypropylene web (3M, St. Paul, MN)
9) One sheet from a LDF 505A 7.5 μm diameter meltblown propylene web (3M)
10) One sheet from a LDF 503A 3.4 μm diameter meltblown polypropylene web (3M)
11) One sheet from a Liquid Disk Filter 505A over another sheet from a Liquid Disk Filter 503A (both from 3M)

The data of Table 1 show that, of the materials tested, blown microfiber filters give the most consistent flow and best analyte recoveries.

Example 2

Comparison of Filter Materials

Various filters were fitted above the disk in 10 mm/6 mL C-18 Empore™ solid phase extraction disk cartridges (3M). Each filter-disk construction was conditioned with methanol, then water prior to application of sample. Approximately 3.0 mL of each sample (i.e., undiluted human serum and urine) was drawn through the filter-disk construction under 25.4 cm Hg vacuum and flow times were measured as in Example 1. Results are presented in Table 2.

TABLE 2

Flow Times Through Various Filters

|  | Flow time for 6 mL cartridge, 3 mL sample volume (sec) | | |
| --- | --- | --- | --- |
| Filter | Water | Urine | Serum |
| None | 43 | 235 | 308 |
| 934-AH glass fiber[1] | — | 43 | 125 |
| GF/B glass fiber[1] | — | 75 | 201 |
| GFD glass fiber[1] | — | 52 | 164 |
| 70 mil polyvinylidenefluoride[2] | — | 272 | 211 |
| 53 mil polytetrafluoroethylene[2] | — | 241 | 458 |
| 20 mil polyethylene #4900[2] | — | 296 | 260 |
| 60 mil polyethylene #X-4920[2] | — | 107 | 340 |
| 1.0 mL high density polyethylene #X-4896[2], rough side up | — | plugged | 296 |
| 1.0 mL high density polyethylene #X-4896[2], rough side down | — | 276 | 410 |
| polyethylene frit[3] | — | 150 | 252 |
| porous polypropylene sheet[4] | — | 312 | 296 |
| scintered polypropylene frit[5] | — | 132 | 246 |
| Empore™ Oil & Grease disk without particles[6] | — | 72 | 213 |
| Empore™ Oil & Grease disk with C-18 particles added[7] | — | 58 | 169 |
| Top layer plus several interior polypropylene layers of Liquid Disk Filter 503A[7] | — | 44 | 92 |

1) Available from Whatman, Inc.
2) Available from Porex, Inc. (Atlanta, GA)
3) Available from Varian, Inc. (Harbor City, CA)
4) Available from Veratec Co.
5) Available from Evergreen Co. (Los Angeles, CA)
6) Available from 3M New Products Dept. on an experimental basis
7) Available from 3M The data of Table 2 show that, for 3 mL of human serum or urine, filters made from polypropylene fibers (such as those that make up the interior layers of 3M Liquid Disk Filters) provide flow rates equal to or faster than glass fiber filters.

Example 3

Comparison of Drug Recovery from Empore™ Extraction Disks with Blown Polypropylene Microfiber vs. Glass Microfiber Filters To examine the effect of filters on drug extraction and recovery, C-8 Empore™ 7 mm/3 mL solid phase extraction disk cartridges (3M) were fitted with filters above the disks. The filters were: (1) a construction of 8 sheets of nonwoven blown polypropylene microfibers, 10 µm effective diameter, atop 5 sheets of nonwoven blown polypropylene microfibers, 3.4 µm effective diameter (3M Filtration Products; St. Paul, Minn.); (2) a gradient density glass microfiber filter designated "GD1M" (Whatman, Inc.); and (3) a gradient density glass microfiber filter designated "GF/D VA" (Whatman, Inc.).

A solution containing 0.4 µg each of verapamil (Sigma Chemicals), flecainide (3M), and mexiletine (U.S. Pharmacopeia; Rockville, Md.) in 1.0 mL deionized (DI) water plus 0.5 mL of 0.01M $K_2HPO_4$ pH 4.5 buffer ("Buffer B") was pulled through the cartridge under 38.1 cm Hg vacuum. The filter-extraction membrane construction was washed with a 0.25 mL 30:70 (v/v) ACN-water mixture and once with 0.25 mL water.

The extracted drugs were eluted from the membrane by two aliquots of 0.2 mL 30:30:40 (v/v/v) ACN-Buffer B-methanol eluting solvent. Percent recovery was measured by liquid chromatography as described in Example 1, using a mobile phase of 35:60:5 (v/v/v) ACN-Buffer B-methanol at 2.0 mL/min and a Supelco™ LC8DB column, with a Supelco™ PCN guard column, at 40° C. The presence and amount of each drug were detected by UV absorbance at 214 nm.

The results are shown below in Table 3.

TABLE 3

Effect of Filters on Drug Recovery

|  |  | Mean Percent Recovery | | |
| --- | --- | --- | --- | --- |
| Delivery | Replicates | Verapamil | Flecainide | Mexiletine |
| Direct inj. (std.) | 2 | 100.0 | 100.0 | 100.0 |
| No filter (comparative) | 4 | 92.6 | 88.5 | 90.5 |
| Polypropylene | 4 | 90.6 | 89.3 | 91.2 |
| GD1M | 4 | 100.9 | 96.7 | 93.7 |
| GF/D VA | 4 | 94.2 | 92.2 | 91.1 |

The data of this table show that, like gradient density glass filters, gradient density polypropylene filters do not have a substantial adverse affect on the quantitative recovery of drugs from solid phase extraction membranes.

Example 4

Preparation of Blown Polypropylene Microfiber Filters

A number samples of blown polypropylene microfiber sheets were prepared according to the method described in Wente, "Superfine Thermoplastic Fibers," *Industrial and Engineering Chemistry*, vol. 48, 1342–46 (1956) and Wente et al., "Manufacture of Superfine Organic Fibers," NRL Report No. 4364 (May 25, 1954). Grade PP3505G polypropylene (Exxon Chemical Co.) was processed into meltblown layers of microfibers, as described in Table 4. In the case of the smallest diameter fibers, description is given for a multiple-layer format. Effective pore diameter was determined according to the method of C. Y. Chen, "Filtration of Aerosols by Fibrous Media," *Chem. Rev.*, 55, 595–623 (1955).

TABLE 4

| Fiber Sample | Effective Fiber Diameter (μm) | Effective Pore Diameter (μm) | Thickness (Mm) | Basis Weight (g/m²) |
|---|---|---|---|---|
| 1 | 3.0 | 11.5 | 0.35 | 22 |
| 2 | 6.6 | 29.9 | 1.21 | 49 |
| 3 | 7.0 | 24 | 0.53 | 50 |
| 4 | 8.3 | 21.8 | 0.52 | 52 |
| 5 | 14.5 | 34.7 | 0.45 | 53 |
| 6 | 15.8 | 45.5 | 0.57 | 50 |
| 7 | 21.4 | 65.4 | 0.65 | 51 |
| 8 | 22.2 | 52.9 | 0.85 | 101 |
| 9 | 22.6 | 61.1 | 0.79 | 77 |
| 10 | 25.6 | 96.3 | 0.95 | 50 |
| C-1[a] | 3.4 | — | — | — |

[a]Comparative example using one delaminated sheet from a Liquid Disk Filter 503A (3M Filtration Products)

Example 5

Influence of Filter Configuration (Fiber Diameter and Number of Layers) on Flow Time To determine an optimal configuration for a graded density filter, the flow times for a number of configurations were tested. Layers of blown polypropylene microfiber sheets, prepared as described in Example 4, were placed in a C-18 Empore™ 7 mm/3 mL solid phase extraction disk cartridge.

Each filter-extraction membrane construction was treated with a solution of 1.0 mL human plasma and 0.5 mL Buffer A under 38.1 cm Hg vacuum. Flow times were measured as described in Example 1.

The results are presented below in Table 5.

TABLE 5

| | Filter Configurations | | | | | |
|---|---|---|---|---|---|---|
| Configuration | Number of sheets having fibers with an effective diameter of . . . | | | | | Flow time (sec) |
| | 3.4 μm | 6.6 μm | 7.0 μm | 15.0 μm | 22.5 μm | |
| 1 | 0 | 0 | 0 | 0 | 0 | 681 |
| 2 | 0 | 1 | 0 | 0 | 0 | 99 |
| 3 | 5 | 0 | 0 | 0 | 0 | 80 |
| 4 | 5 | 1 | 0 | 0 | 0 | 89 |
| 5 | 0 | 0 | 0 | 1 | 0 | 326 |
| 6 | 0 | 1 | 0 | 1 | 0 | 103 |
| 7 | 5 | 0 | 0 | 1 | 0 | 85 |
| 8 | 5 | 1 | 0 | 1 | 0 | 87 |
| 9 | 0 | 0 | 0 | 0 | 0 | 686 |
| 10 | 0 | 0 | 1 | 0 | 0 | 104 |
| 11 | 5 | 0 | 0 | 0 | 0 | 83 |
| 12 | 5 | 0 | 1 | 0 | 0 | 78 |
| 13 | 0 | 0 | 0 | 1 | 0 | 473 |
| 14 | 0 | 0 | 1 | 1 | 0 | 105 |
| 15 | 5 | 0 | 0 | 1 | 0 | 78 |
| 16 | 5 | 0 | 1 | 1 | 0 | 78 |
| 17 | 0 | 2 | 1 | 0 | 0 | 88 |
| 18 | 0 | 2 | 0 | 1 | 1 | 87 |
| 19 | 0 | 0 | 2 | 1 | 1 | 97 |
| 20 | 5 | 1 | 1 | 0 | 0 | 78 |
| 21 | 5 | 0 | 2 | 0 | 0 | 78 |
| 22 | 5 | 2 | 0 | 0 | 0 | 85 |
| 23 | 5 | 1 | 0 | 1 | 0 | 82 |
| 24 | 5 | 0 | 1 | 1 | 0 | 73 |
| 25 | 5 | 0 | 2 | 1 | 0 | 82 |
| 26 | 5 | 2 | 0 | 1 | 0 | 90 |
| 27[a] | — | — | — | — | — | 78 |
| 28[b] | — | — | — | — | — | 76 |

[a]Same as polypropylene filter from Example 3.
[b]GD1M glass filter (Whatman).

Example 6

Human Plasma Flow Rates with and without Graded Density Filter

A three layer gradient density filter was constructed from blown polypropylene microfiber sheets, described in Example 4, as follows: one sheet having fibers with an effective diameter of 15 μm was placed on one sheet having fibers with an effective diameter of 7 μm which was placed on five sheets having fibers with an effective diameter of 3.4 μm (hereafter referred to as the "1/1/5 filter").

A circular section was cut from the 1/1/5 filter and placed in a 7 mm/3 mL C-18 Empore™ solid phase extraction disk cartridge. Flow times for 1.0 mL of human plasma diluted with 0.5 mL Buffer A through the extraction disk, with and without a filter, at 38.1 cm Hg vacuum were measured with fresh plasma and with plasma that had been refrigerated for three days. The refrigerated sample was quite viscous, containing more fibrin and microbial content than the fresh sample. The results are shown below in Table 6.

TABLE 6

| | Flow times, fresh plasma (sec) | | Flow times, refrigerated plasma (sec) | |
|---|---|---|---|---|
| Sample No. | Filter | No filter | Filter | No filter |
| 1 | 60 | 138 | 73 | 658 |
| 2 | 61 | 140 | 71 | 662 |
| 3 | 60 | 141 | 73 | 737 |
| 4 | 63 | 137 | 75 | 685 |
| Average | 61 | 139 | 73 | 686 |

The data of Table 6 show that the flow times for fresh plasma-buffer mixtures improve 128% and the flow times for refrigerated plasma-buffer mixtures improve 840% when the 1/1/5 filter is used above an extraction disk.

Example 7

Effect of Cover Layer

Several cover layers, which aid in holding the 1/1/5 filter (see Example 6) in place during extraction and elution, were compared: (1) a polypropylene screen (Internet Co.; New Hope, Minn.); (2) a Typar™ 3801 spunbonded polypropylene membrane; and (3) the molded polypropylene ring commercially supplied with an Empore™ 7 mm/3 mL solid phase extraction disk cartridge. In addition to being used with an Empore™ 7 mm/3 mL solid phase extraction disk cartridge, the 1/1/5 filter was also used with a SPEC™ •3 ML solid phase extraction device containing a glass fiber disk in which is entrapped 15 mg C-18 bonded silica microparticles (Ansys Co.; Irvine, Calif.).

Fresh samples of human plasma (1.0 mL, diluted with 0.5 mL Buffer A) were pulled through columns, with and without filters, that contained a solid phase extraction disk, under 38.1 cm Hg. Results are shown below in Table 7.

TABLE 7

| | Performance of 1/1/5 filter | | | | | |
|---|---|---|---|---|---|---|
| | Flow times (sec) for various configurations | | | | | |
| Trial | 1 | 2 | 3 | 4 | 5 | 6 |
| A | plugged[7] | plugged[7] | 86 | 13 | 67 | 67 |

TABLE 7-continued

Performance of 1/1/5 filter

| | Flow times (sec) for various configurations | | | | | |
|---|---|---|---|---|---|---|
| Trial | 1 | 2 | 3 | 4 | 5 | 6 |
| B | plugged[7] | plugged[7] | 85 | 12 | 74 | 67 |
| C | plugged[7] | plugged[7] | 86 | 13 | 73 | 74 |

1) Empore™ cartridge without filter.
2) SPECT™ cartridge without filter.
3) Empore™ cartridge with filter, polypropylene screen as cover layer.
4) SPECT™ cartridge with filter, polypropylene screen as cover layer.
5) Empore™ cartridge with filter, molded polypropylene ring as cover layer.
6) Empore™ cartridge with filter, spundbonded polypropylene membrane as cover layer.
7) Approximately 1 mL of plasma-buffer solution remained in cartridge after 15 minutes.

The data of Table 7 show that filters prevent plugging of solid phase extraction disks and that a number of devices and configurations for covering or holding down the filter do not detract from satisfactory flow times.

Example 8

Drug Recovery Using Filter with Cover

A stock solution that contained 10.0 µg of both diazepam and nordiazepam (both available from Sigma Chemicals) per mL DI water was prepared. Samples of 1.0 mL human plasma or 1.0 mL DI water were diluted with 0.5 mL 0.05 M pH 5.0 ammonium acetate buffer ("Buffer C") and doped with 50 µL of the stock solution, such that the total volume of each sample was 1.55 mL.

The samples were passed, under 38.1 cm Hg vacuum, through a C-18 Empore™ 7 mm/3 mL solid phase extraction disk cartridge containing either (1) a 1/1/5 filter (see Example 6), referred to in Table 8 as "Filter B", with a cover layer of Typar™ 3801 spunbonded polypropylene web, a polypropylene screen, or a standard Empore™ polypropylene ring; or (2) a filter containing eight sheets of blown polypropylene microfibers having an effective fiber diameter of 10 µm over five sheets of blown polypropylene microfibers having an effective fiber diameter of 3.4 µm, referred to in Table 8 as "Filter A". The extraction disks were washed with 0.5 mL 25:75 ACN-water solution and eluted twice with 0.2 mL methanol, and the eluate was stirred with an additional 0.4 mL Buffer C.

The amount of each drug in the eluate was measured by liquid chromatography, using a Waters Instruments Model 486 HPLC fitted with a 15 cm×4.6 mm Supelco™ LC-18DB column and a Supelco™ C-18 guard column at a column temperature of 30° C. The mobile phase, a 55:45 (v/v) ACN-Buffer C solution, was pumped at 2.0 mL/min. The drugs were detected by UV absorbance at 242 mn with a sensitivity of 0.005 AUFS. Results are shown below in Table 8.

TABLE 8

Percent Recovery of Drugs from Human Plasma and DI Water

| Filter construction | Plasma | | Deionized water | |
|---|---|---|---|---|
| | Diazepam | Nor-diazepam | Diazepam | Nor-diazepam |
| None | — | — | 90 | 91 |
| Filter A | 94 | 54 | — | — |
| Filter B + ring | 94 | 55 | — | — |
| Filter B + screen | 94 | 54 | 98 | 98 |
| Filter B + membrane | 94 | 52 | 99 | 100 |

The data of Table 8 show that excellent recoveries of the two drugs can be obtained from solid phase extraction columns containing a solid phase extraction disk and a gradient density filter that includes a cover layer. (Elution of nordiazepam from plasma was not quantitative due to pH dependence.)

Example 9

Dead Volume/Holdup Comparison

Dead volumes of cartridges that include filters held in place by polypropylene screens and by Typar™ spunbonded polypropylene webs were determined and compared to dead volumes of cartridges without filters. C-18 Empore™ 7 mm/3 mL solid phase extraction disk cartridges were prepared without a filter, with a 1/1/5 filter having a polypropylene screen cover layer, and with a 1/1/5 filter having a Typar™ membrane cover layer.

After each cartridge was weighed dry, each was conditioned by pulling 0.25 mL methanol followed by 0.5 mL DI water through the disk under 38.1 cm Hg vacuum, with the vacuum being left on for two seconds of drying. Each cartridge was then weighed again. Thereafter, the cartridges were treated with two rinses of 0.2 mL of a mobile phase of a 68:17:15 (v/v/v) mixture of acetonitrile-methanol-Buffer A, with the vacuum being left on for two seconds of drying, then weighed. Holdup volumes of water and mobile phase are reported in Table 9.

TABLE 9

| | Dead Volume | |
|---|---|---|
| | Dead Volume[1] (µL) | |
| Construction | Water[2] | Mobile phase[3] |
| No filter | 29 | 20 |
| Filter + screen | 46 | 33 |
| Filter + membrane | 69 | 51 |

1) Three measurements were taken and the mean value is shown in the table.
2) Density = 1.0 g/mL.
3) Density = 0.78 g/mL The data from Table 9 show that the covering materials do increase the dead volume. However, relative to the total elution volume (e.g., 200 to 400 µl) required for a specific assay, this increase is slight.

Example 10

Effect of Cover Layer on Flow Time

C-18 Empore™ 7 mm/3 mL solid phase extraction disk cartridges fitted with 1/1/5 filters and either a polypropylene screen or a Typar™ web cover layer upstream from the filter were charged with a solution of 1.0 ml human plasma and 0.5 mL Buffer A. Flow times under 38.1 cm Hg vacuum were measured. Twelve measurements were taken for each configuration.

The mean flow time for cartridges fitted with the screen cover layer was 228 seconds (range: 165 to 305 seconds), whereas the mean flow time for cartridges fitted with a Typar™ web cover layer was 158 seconds (range: 140 to 192 seconds). These flow times show that the Typar™ web cover layer generally provides faster flow times and improved efficiency by adding an additional layer that has filtration capability.

Various modifications and alterations that do not depart from the scope and spirit of this invention will become apparent to those skilled in the art. This invention is not to be unduly limited to the illustrative embodiments set forth herein.

We claim:

1. A filter for removing insoluble materials from a liquid, said filter having upstream and downstream sides, comprising a plurality of sheets of blown polypropylene microfibers, at least one of said sheets having an effective pore diameter smaller than the effective pore diameter of at least one sheet upstream therefrom, all of said polypropylene fibers having a critical wetting surface tension less than about 50 dynes/cm, the aggregate average diameter of said microfibers being at least 3 µm.

2. The filter of claim 1 comprising at least three of said sheets.

3. The filter of claim 2 wherein the microfibers of at least one of said sheets have an average diameter of about 3 µm, the microfibers of at least one of said sheets have an average diameter of about 7 µm, and the microfibers of at least one of said sheets have an average diameter of about 15 µm.

4. The filter of claim 3 wherein at least five of said sheets comprise microfibers having an average diameter of about 3 µm.

5. The filter of claim 1 further comprising a cover layer.

6. The filter of claim 5 wherein said cover layer is a polypropylene screen.

7. The filter of claim 5 wherein said cover layer is a spunbonded polypropylene sheet.

8. The filter of claim 1 wherein said polypropylene microfibers are essentially free of binder and finishing agent.

9. A solid phase extraction device comprising:
  a) a solid phase extraction medium, and
  b) above said solid phase extraction medium, the filter of claim 1.

10. The device of claim 9 wherein said extraction medium is a packed bed of particles.

11. The device of claim 9 wherein said extraction medium is a disk.

12. The device of claim 11 wherein said disk comprises a porous, fibrous polymeric web in which is entrapped sorptive particles.

13. The device of claim 12 wherein said sorptive particles are at least one of silica, derivatized silica, bonded silica, activated carbon, alumina, or derivatized or underivatized poly(styrene divinylbenzene).

14. The device of claim 12 wherein said polymer is polytetrafluoroethylene.

15. The device of claim 11 further comprising at least one ring to retain said disk or said filter.

16. The device of claim 15 wherein said ring retains said filter.

* * * * *

UNITED STATES PATENT AND TRADEMARK OFFICE
CERTIFICATE OF CORRECTION

PATENT NO.: 5,472,600

DATED: December 5, 1995

INVENTOR(S): Peter J. Ellefson and David A. Wells

It is certified that error appears in the above-identified patent and that said Letters Patent is hereby corrected as shown below:

| | |
|---|---|
| Col. 6, line 55 | "Valley, NM" should read -- Valley, MN -- |
| Col. 7, Table 2, Fourth line under column heading "Filter" | "GFD" should read -- GF/D -- |
| Col. 9, Table 4, Fourth column heading | "(Mm)" should read -- (mm) -- |
| Col. 9, line 16 | "dclaminated" should read -- delaminated -- |
| Col. 11, line 64 | "mn" should read -- nm -- |

Signed and Sealed this

Twentieth Day of August, 1996

Attest:

BRUCE LEHMAN

*Attesting Officer*    *Commissioner of Patents and Trademarks*